US012687430B2

(12) United States Patent
Murphy

(10) Patent No.: US 12,687,430 B2
(45) Date of Patent: Jul. 21, 2026

(54) SPECTROFEROMETER

(71) Applicant: Layer Metrics Inc., Wilmington, DE (US)

(72) Inventor: Dominic Murphy, Wilmington, DE (US)

(73) Assignee: Layer Metrics Inc., Wilmington, DE (US)

( * ) Notice: Subject to any disclaimer, the term of this patent is extended or adjusted under 35 U.S.C. 154(b) by 518 days.

(21) Appl. No.: 17/759,518

(22) PCT Filed: Jan. 27, 2021

(86) PCT No.: PCT/US2021/015163

§ 371 (c)(1),
(2) Date: Jul. 27, 2022

(87) PCT Pub. No.: WO2021/154772

PCT Pub. Date: Aug. 5, 2021

(65) Prior Publication Data

US 2023/0092539 A1     Mar. 23, 2023

Related U.S. Application Data

(60) Provisional application No. 62/966,149, filed on Jan. 27, 2020.

(51) Int. Cl.
| | |
|---|---|
| *G01J 3/02* | (2006.01) |
| *G01J 3/18* | (2006.01) |
| *G01J 3/45* | (2006.01) |

(52) U.S. Cl.
CPC .............. *G01J 3/0218* (2013.01); *G01J 3/18* (2013.01); *G01J 3/45* (2013.01); *G01J 2003/1842* (2013.01)

(58) Field of Classification Search
CPC .... G01J 3/18; G01J 3/45; G01J 3/0218; G01J 3/0229; G01J 2003/1842
See application file for complete search history.

(56) References Cited

U.S. PATENT DOCUMENTS

| | | | |
|---|---|---|---|
| 4,657,390 A * | 4/1987 | Doyle | G01N 21/253 356/244 |
| 4,799,001 A | 1/1989 | Burch | |
| 6,091,872 A | 7/2000 | Katoot | |
| 6,271,052 B1 | 8/2001 | Miller et al. | |

(Continued)

FOREIGN PATENT DOCUMENTS

| | | | | |
|---|---|---|---|---|
| EP | 1747434 B1 * | 7/2011 | | G01J 3/10 |
| WO | 2019141689 A1 | 7/2019 | | |

*Primary Examiner* — Shawn Decenzo
(74) *Attorney, Agent, or Firm* — Fox Rothschild LLP

(57) ABSTRACT

Spectroferometers and methods of use are provided. The spectroferometers includes an enclosure, one or more interferometer beam-splitting elements, and one or more spectrometer beam-dispersing elements. The one or more interferometer beam-splitting elements and the one or more spectrometer beam-dispersing elements are housed in the enclosure, share one or more radiation sensitive elements, which are arranged to generate a signal in response to incident electromagnetic radiation, and each generate one or more optical outputs. The one or more optical outputs are arranged such that respective optical axes intersect substantially in a plane of the one or more radiation sensitive elements.

20 Claims, 3 Drawing Sheets

(56)            References Cited

U.S. PATENT DOCUMENTS

| | | | |
|---|---|---|---|
| 6,385,221 | B1 * | 5/2002 | Neuberger ............ H01S 5/4031 |
| | | | 372/38.02 |
| 10,837,833 | B1 * | 11/2020 | Paudel .................. G01J 3/0208 |
| 2002/0076651 | A1 * | 6/2002 | Hurditch .................. C08J 3/091 |
| | | | 522/31 |
| 2004/0125434 | A1 * | 7/2004 | Kumar .................... G02F 1/395 |
| | | | 359/330 |
| 2009/0251705 | A1 * | 10/2009 | Le ...................... G01N 21/7703 |
| | | | 356/491 |
| 2012/0281223 | A1 | 11/2012 | Mortimer |
| 2013/0221241 | A1 | 8/2013 | Rowlands et al. |
| 2013/0258334 | A1 * | 10/2013 | Sunami .................. G01N 21/19 |
| | | | 356/327 |
| 2014/0347659 | A1 * | 11/2014 | Murphy ............... G01J 3/0218 |
| | | | 356/300 |
| 2015/0085284 | A1 * | 3/2015 | Auner ...................... G01J 3/44 |
| | | | 356/328 |
| 2018/0066990 | A1 | 3/2018 | Schardt |
| 2019/0021601 | A1 * | 1/2019 | Subhash ............. A61B 5/0088 |
| 2020/0037871 | A1 * | 2/2020 | Podoleanu ........... A61B 3/0008 |
| 2021/0196126 | A1 * | 7/2021 | Pan ........................ A61B 3/102 |

* cited by examiner

SPECTROFEROMETER

CROSS-REFERENCE TO RELATED APPLICATIONS

This application is the U.S. national phase of International Patent Application No. PCT/US21/15163, filed on Jan. 27, 2021, which claims priority under 35 U.S.C. § 119(e) to U.S. Provisional Patent Application No. 62/966,149, filed Jan. 27, 2020. The foregoing application is incorporated herein by reference in its entirety.

FIELD OF THE INVENTION

The present invention relates to spectrometers, spectroscopes, radiometers, interferometers and particularly, but not exclusively, to optical spectroferometers.

BACKGROUND OF THE INVENTION

Interferometers and spectrometers are used in a variety of disciplines to measure the properties of electromagnetic radiation, such as light. They are used to measure various properties of the radiation, such as, for example, its intensity, polarization, wavelength, frequency, or phase.

Interferometers and spectrometers may be considered electromagnetic wave-processing systems, which collect electromagnetic radiation, manipulate the collected electromagnetic radiation to generate a pattern from the electromagnetic radiation, detect the generated pattern formed from the collected and manipulated electromagnetic radiation, and generate a signal in response to detecting the detected pattern. The elements of the interferometers and spectrometers may be static or dynamic and their elements may be mounted so as to allow them to be statically or dynamically scanned or translated.

In some interferometer systems, electromagnetic radiation is passed through a Young's slits arrangement to form two or more sources of secondary radiation that diffract as the sources exit the slits and then interfere as they overlap. The interference pattern is then detected as an interferogram, which is a spatial representation of the interference pattern. The form of the interferogram is determined by the spectral components of the diffracted light.

In some spectrometer systems, electromagnetic radiation is passed through a diffraction grating and imaging arrangement to form multiple secondary sources of radiation that diffract as they exit the slits and then interfere as they overlap. The interference pattern is then detected as a spectrogram, which is a spatial representation of the interference pattern. The form of the spectrogram is determined by the spectral components of the diffracted light.

Detector arrays are commonly used to record and capture interferogram, spectrogram, and image patterns for signal processing and analysis. A range of image analysis, frequency analysis, mathematical transforms, fringe counting, machine vision, and weighting algorithms are commonly used to analyze the patterns to recover amplitude, intensity, temporal information, spectral information, and/or phase information, among other data.

Interferometers and spectrometers are typically used independently and do not share the same housing, optics, or detection elements, and the generated and detected patterns in interferometer and spectrometer instruments typically differ largely in distributed frequency and amplitude. For example, considering low-coherence sources, the interference pattern produced using a wavefront interferometer contains a small number of high frequency oscillations over a narrow extent, whereas the spectral pattern contains a large number of low frequency oscillations over a wide extent. The converse is respectively true for a high-coherence source.

Interferometers are typically best operated in single-mode for highest visibility, fidelity, and resolution such that the collection of low-coherence light is limited due to the wide vector variance nature of such light, whereas spectrometer instruments are significantly less limited. Spectrometers are susceptible to saturation when operated with high-coherence light as the narrow vector variance nature of the laser light results in most of the light illuminating only one or few pixels driving them into saturation, whereas wavefront interferometers disperse the laser light over most of the pixels in the array.

For at least these reasons, there is a need for improved spectroferomters that avoid these limitations.

SUMMARY OF THE INVENTION

According to an aspect of the present disclosure, a spectroferometer is provided. The spectroferometer includes an enclosure, one or more interferometer beam-splitting elements, and one or more spectrometer beam-dispersing elements. The one or more interferometer beam-splitting elements and the one or more spectrometer beam-dispersing elements are housed in the enclosure, share one or more radiation sensitive elements, which are arranged to generate a signal in response to incident electromagnetic radiation, and each generate one or more optical outputs. The one or more optical outputs are arranged such that respective optical axes intersect substantially in a plane of the one or more radiation sensitive elements.

According to various aspects, the spectroferometer further includes one or more reflective surfaces between the optical outputs.

According to various aspects, the one or more reflective surfaces include one or more optical coatings on one or more of the surfaces.

According to various aspects, the one or more of the reflective surfaces are microelectromechanical systems (MEMS) elements. Each of the MEMS elements are controllable and are configured to reflect a portion of the incident electromagnetic radiation.

According to various aspects, the one or more radiation sensitive elements are configured to detect one or more inputs originating from one or more spatially distinct locations.

According to various aspects, the one or more inputs include the one or more optical outputs from the one or more interferometer beam-splitting elements and/or the one or more spectrometer beam-dispersing elements.

According to various aspects, the one or more inputs include one or more imaging bundles.

According to various aspects, the one or more inputs include one or more optical waveguides.

According to various aspects, the one or more optical waveguides include one or more optical fibers.

According to various aspects, wherein the spectroferometer further includes one or more optical waveguides.

According to various aspects, the one or more optical waveguides include one or more optical fibers.

According to various aspects, the one or more optical fibers include one or more of: microstructured optical fibers; and multicore optical fibers.

According to various aspects, the one or more interferometer beam-splitting elements are dynamically adjustable.

According to various aspects, the one or more spectrometer beam-dispersing elements are dynamically adjustable.

According to various aspects, the spectroferometer further includes one or more processors, and a memory. The memory is configured to store instructions which, when executed by the one or more processors, cause the one or more processors to process one or more signals generated by the one or more radiation sensitive elements, and generate a spatial intensity profile of the incident electromagnetic radiation.

According to various aspects, the instructions, when executed by the one or more processors, further cause the one or more processors to recover data from the spatial intensity profile using one or more of: transform processing techniques; curve fitting techniques; frequency filtering techniques; fringe counting techniques; interpolation techniques; weighting techniques; one or more orders of differentiation; one or more orders of integration; predictive analysis techniques; machine learning techniques; and artificial intelligence techniques. The data includes one or more of: temporal data; spectral data; phase data; amplitude data; and polarization data.

According to another aspect of the present disclosure, a method of analyzing electromagnetic radiation is provided. The method includes providing a spectroferometer. The spectroferometer includes an enclosure, a processor, a memory, one or more interferometer beam-splitting elements, and one or more spectrometer beam-dispersing elements. The one or more interferometer beam-splitting elements and the one or more spectrometer beam-dispersing elements are housed in the enclosure, share one or more radiation sensitive elements, which are arranged to generate a signal in response to incident electromagnetic radiation, and each generate one or more optical outputs. The one or more optical outputs are arranged such that respective optical axes intersect substantially in a plane of the one or more radiation sensitive elements. The method further includes processing, using the processor, one or more signals generated by the one or more radiation sensitive elements, and generating a spatial intensity profile of the incident electromagnetic radiation.

According to various embodiments, the method further includes recovering, using the processor, data from the spatial intensity profile using transform processing techniques, curve fitting techniques, frequency filtering techniques, fringe counting techniques, interpolation techniques, weighting techniques, one or more orders of differentiation, one or more orders of integration, predictive analysis techniques, machine learning techniques, and/or artificial intelligence techniques. The data includes one or more of: temporal data; spectral data; phase data; amplitude data; and polarization data.

Further features and advantages of the invention will become apparent from the following description of preferred embodiments of the invention, given by way of example only, which is made with reference to the accompanying drawings.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION OF THE INVENTION

Figure 1:
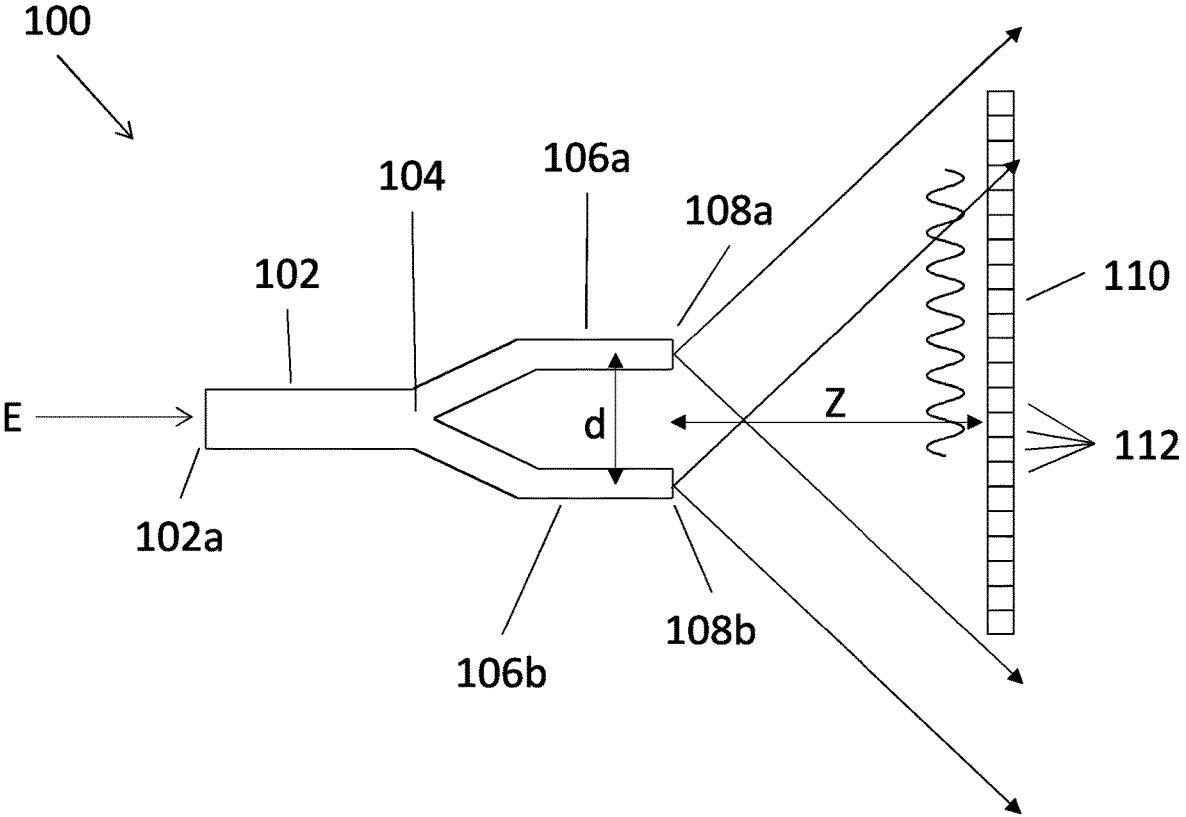
FIG. 1 is a schematic diagram of a known wavefront interferometer.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are implicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to." When used in this document, the term "exemplary" is intended to mean "by way of example" and is not intended to indicate that a particular exemplary item is preferred or required.

In this document, the term "approximately," when used in connection with a numeric value, is intended to include values that are close to, but not exactly, the number. For example, in some embodiments, the term "approximately" may include values that are within +/−10 percent of the value.

Various embodiments of the present disclosure pertain to the simultaneous capturing and recording of synchronized data sets of multiple different signal types and derivative information from different signal types including, but not limited to, spectral data, interference data, image data, and/or related data. According to various embodiments, simultaneous collection and imaging of low-coherence, low-intensity light onto a shared detector array using a spectrogram-generating system, and collecting and imaging high-coherence, high-intensity light onto a shared detector array using an interferogram-generating system are provided. In example embodiments, collection and imaging light from multiple locations and/or from multiple instruments onto a shared detector array are also provided.

Referring now to FIG. 1, a schematic diagram of an example prior art interferometer 100, based upon a fiber-optic interferometer, is illustratively depicted.

As shown in FIG. 1, the interferometer 100 includes an input aperture. The aperture may be a waveguide arm 102 having a fiber-optic input port 102a, a 1×2 fiber-optic coupler/splitter 104, and two output fiber-optic waveguide arms 106a, 106b. Each of the two output fiber-optic waveguide arms 106*a*, 106*b* has a fiber-optic optical output port 108*a*, 108*b*. Each of the waveguide arms may include a core region surrounded by a cladding region having a refractive index lower than the core region. The output ports 108*a*, 108*b* are separated by a distance, d. According to various embodiments, the distance, d, is approximately between 1 to 10 mm.

Each wavelength of light being transmitted in a given waveguide arm 102, 106*a*, 106*b* exists as an optical mode. Each mode typically exhibits a particular spatial extent and has a characteristic mode profile that is dependent on the waveguide parameter of the waveguide arm 102, 106*a*, 106*b*. The waveguide parameter is dependent on the relative refractive indices and dimensions of the core and cladding regions and the wavelength of light being transmitted. Each of the fiber-optic waveguide arms 102, 106*a*, and 106*b* is a single mode waveguide arm for wavelengths longer than a certain minimum wavelength corresponding to a highest frequency of light for which the interferometer 100 is designed to work.

The interferometer 100 includes a splitter 104 that is configured to split the light received at the input port 102*a* substantially equally between the two output ports 108*a*, 108*b*.

According to an example of use of the interferometer 100, electromagnetic radiation, E, such as light that is to be analyzed, is received by (i.e., coupled into) the input port 102*a* of the input waveguide arm 102 and split, by the splitter 104, between the output waveguide arms 106*a*, 106*b*. The split light emerges, respectively, from the two output ports 108*a*, 108*b*. The emerging light diffracts and interferes to form a characteristic interference pattern that illuminates, and can be detected by, a detector 110, which is spaced apart by a distance, Z, from the output ports 108*a*, 108*b*. The detector 110 may be, for example, an array of individual photosensitive detector elements (pixels) 112, such as a charge-coupled device (CCD) detector array.

Each of the output ports 108*a*, 108*b* includes a numerical aperture, which can be wavelength dependent and relates to the relative refractive indices of a waveguide core region and a waveguide cladding region, as well as the physical size of the waveguide core. Light emerging from the output ports 108*a*, 108*b* will diffract into the surrounding medium (typically air) with a divergence angle that depends on the numerical aperture of the respective output port 108*a*, 108*b*. Typically, each of the output ports 108*a*, 108*b* has the same numerical aperture for a given wavelength.

As the two diffracted beams emerge from the output ports 108*a*, 108*b* and propagate and diverge, the beams spatially overlap such that the fields of the wave fronts interfere. The fields, due to the overlapping beams, provide an intensity variation that depends on a relative optical path delay difference, which is, in turn, dependent on the wavelength of the emerging light. This intensity variation in a given plane is an interference fringe pattern that is characteristic of the emerging light. The delay difference evolves across the detector surface 110 to form the interference fringes and is used to form an interferogram, which is a spatially or temporally dependent image or representation of the light intensity variation in the plane of the detector 110.

Each of the elements 112 of the detector 110 is arranged, for example, to generate a charge signal proportional to the intensity of light incident on the element 112, such that the detector 110 can be used to measure the interference pattern and form the interferogram. Typically, the interferometer 100 is arranged such that at least two elements 112 of the detector 110 detect light from each interference fringe in order that the spatial sampling rate is at least twice the spatial periodicity of the interference fringe pattern. This enables the interferometer 100 to satisfy the Nyquist sampling criterion and provide a lossless measurement of the fringe periodicity.

Typically, the interferogram is processed by either dedicated processing electronics (not shown), or a computer programmed with suitable processing software that receives a digital representation of the interferogram. The processing electronics or computer reads the charge signals from the detector to form a spatial intensity profile, thus capturing an image of the interference fringes (the interferogram) at a rate above the Nyquist rate. The processing electronics or processing software may then process the captured spatial image data using, for example, one or more of mathematical transform processing, Fourier Transform processing, Hilbert Transform processing and statistical analysis, fringe counting and weighting, or any other suitable processing technique, to analyze the spatially dependent intensity pattern. This enables characterization of the light illuminating the interferometer 100 and enables temporal and/or spectral and/or phase and/or amplitude and/or polarization information to be recovered.

Figure 2:
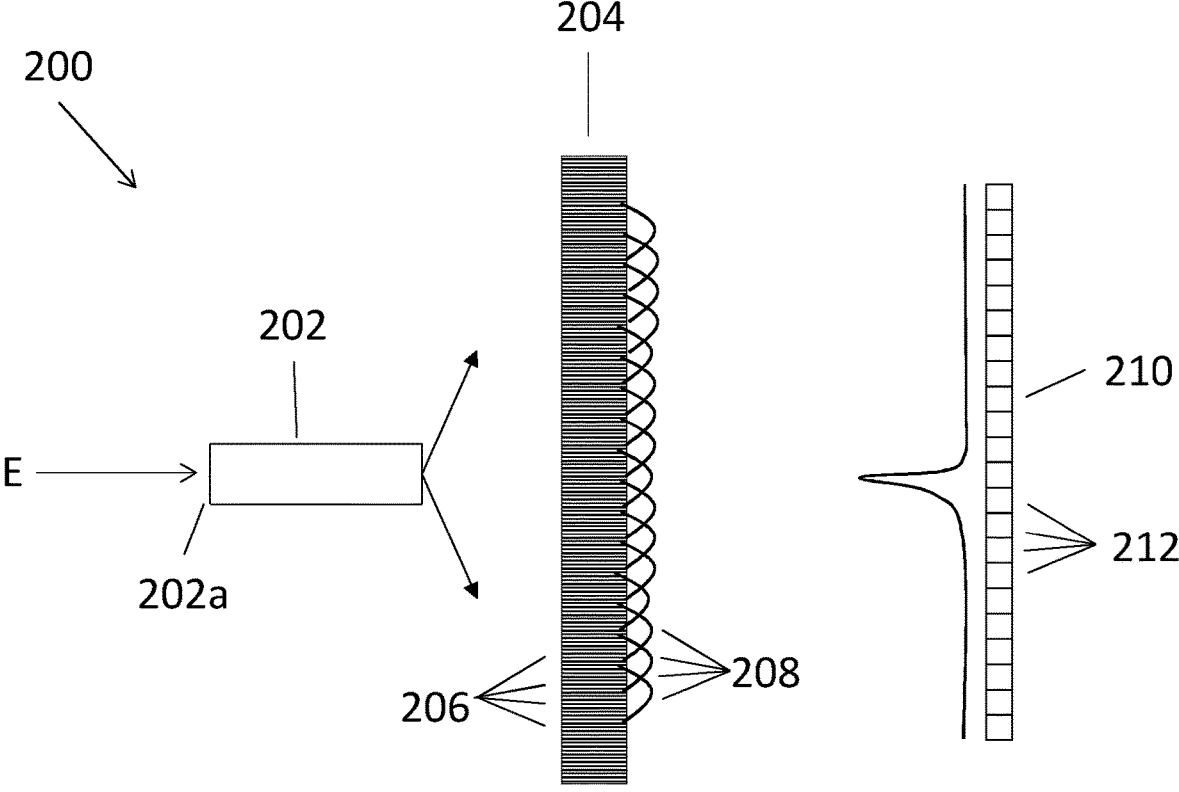
FIG. 2 is a schematic diagram of a known diffraction grating spectrometer.

Referring now to FIG. 2, a schematic diagram of an example of one type of prior art spectrometer 200, based upon a transmission diffraction grating spectrometer, is illustratively depicted.

The spectrometer 200 includes an input aperture that may be a waveguide arm 202 having a fiber-optic input port 202*a* and a transmission diffraction grating 204. Additional beam-shaping, collimating, and filtering optics may be included for example but for simplicity they are not shown here.

The diffraction grating 204 interrupts the light incident on it and splits the light via the grating lines 206 and emits multiple secondary wavefronts 208.

According to an example of use of the spectrometer 200, electromagnetic radiation, E, such as light that is to be analyzed, is received by (i.e., coupled into) the input port 202*a* of the input waveguide arm 202 and interrupted by the lines 206 of the diffraction grating 204, causing multiple secondary output wavefronts of light 208 to emerge, respectively, from the diffraction grating 204. The emerging light diffracts and interferes to form a characteristic diffraction interference pattern that illuminates, and can be detected by, a detector 210. The detector 210 may be, for example, an array of individual photosensitive detector elements (pixels) 212, such as a CCD detector array.

Each of the outputs 208 from the diffraction grating lines 206 has a numerical aperture, which, respectively, can be wavelength dependent and can relate material index properties as well as the physical sizes. Light emerging from the lines 206 diffracts into the surrounding medium (typically air) with a divergence angle that depends on the numerical aperture of the respective lines. Typically, the grating lines will be uniform so each line of the lines 206 has the same numerical aperture for a given wavelength.

As the beams diffract outward from the diffraction grating 204, they, respectively, propagate and diverge, and the beams spatially overlap such that the fields of the wavefronts interfere. The fields, due to the overlapping beams, provide an intensity variation that depends on a relative optical path delay differences which is, in turn, dependent on the wavelength of the emerging light. This intensity variation in a given plane is an interference fringe pattern that is known as a diffraction pattern that is characteristic of the emerging light. The delay difference evolves across the detector surface 210 to form the interference fringes and is used to form a diffraction pattern, which is a spatially- or temporally-dependent image or representation of the light intensity variation in the plane of the detector 210.

Each of the elements 212 of the detector 210 is arranged, for example, to generate a charge signal proportional to the intensity of light incident on the element 212, such that the detector 210 can be used to measure the diffraction pattern and infer a spectrum. For broad band operation, the spectrometer 200 is typically arranged such that each wavelength of light is confined to one or few of the elements 212 of the detector 210 to optimize the number of wavelengths that can be detected and resolved in the spectrum of incident light.

Typically, the diffraction pattern is processed by either dedicated processing electronics (not shown), or a computer programmed with suitable processing software that receives a digital representation of the interferogram. The processing electronics or computer reads the charge signals from the detector to form a spatial intensity profile, thus capturing an image of the diffraction pattern. The processing electronics or processing software may then process the captured spatial image data using, for example, one or more of fringe counting and weighting, transform processing, or any other suitable processing technique, to analyze the spatially dependent intensity pattern. This enables characterization of the light illuminating the spectrometer 200 and enables spectral information to be recovered that may be further analyzed and processed.

Figure 3:
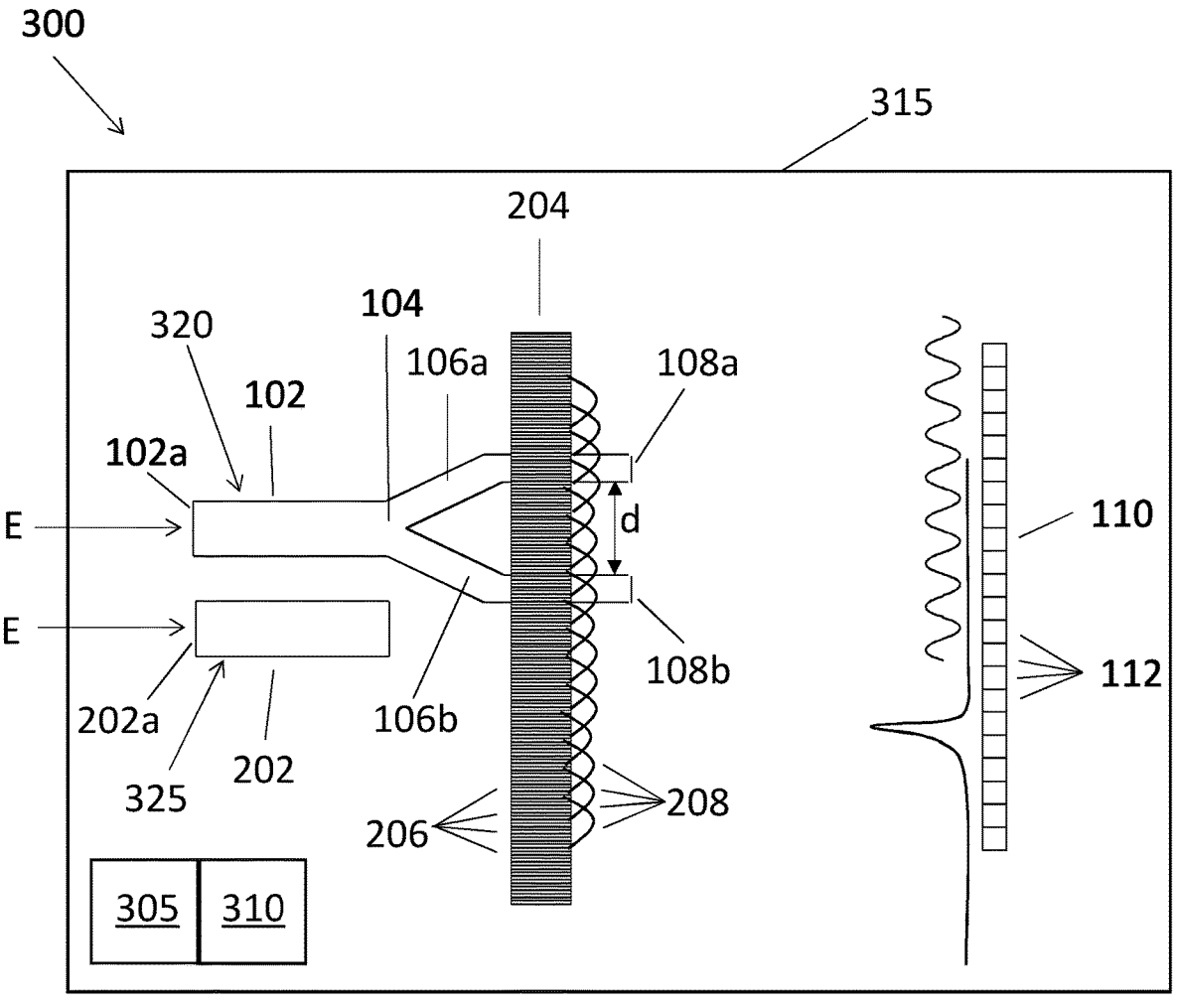
FIG. 3 is a schematic diagram of a spectroferometer according to an embodiment of the present disclosure.

Referring now to FIG. 3, a schematic diagram showing an exemplary embodiment of a spectroferometer 300 is illustratively depicted, in accordance with various embodiments of the present disclosure.

The spectroferometer 300 includes one or more interferometer beam-splitting elements 320 and one or more spectrometer beam-dispersing elements 325. According to various embodiments, the one or more interferometer beam-splitting elements 320 and the one or more spectrometer beam-dispersing elements 325 are housed within an enclosure 315. The one or more interferometer beam-splitting elements 320 and the one or more spectrometer beam-dispersing elements 325 share one or more radiation sensitive elements, which are arranged to generate a signal in response to incident electromagnetic radiation, and are configured to generate one or more optical outputs. The one or more optical outputs are arranged such that respective optical axes intersect substantially in a plane of the one or more radiation sensitive elements.

According to various embodiments, the spectroferometer 300 includes one or more reflective surfaces between optical outputs. The one or more reflective surfaces include one or more optical coatings on one or more of the surfaces. The one or more reflective surfaces can include one or more microelectromechanical systems (MEMS) elements. According to various embodiments, each of the MEMS elements are controllable and are configured to reflect a portion of the incident electromagnetic radiation.

According to various embodiments, the one or more radiation sensitive elements are configured to detect one or more inputs originating from one or more spatially distinct locations. The one or more inputs include the one or more optical outputs from the one or more interferometer beam-splitting elements and/or the one or more spectrometer beam-dispersing elements. In some embodiments, the one or more inputs include one or more imaging bundles. In some embodiments, the one or more inputs include one or more optical waveguides. The one or more optical waveguides can include one or more optical fibers. The one or more optical fibers can include microstructured optical fibers, multicore optical fibers, and/or other suitable forms of optical fiber.

The spectroferometer 300 includes one or more input apertures that may be waveguide arms 102, 202, a fiber-optic coupler/splitter 104 that may be 1×2, n×2, 1×n or n×n, and output fiber-optic waveguide arms 106a, 106b, each having a fiber-optic optical output port 108a, 108b. Each of the waveguide arms includes a core region surrounded by a cladding region having a refractive index lower than the core region. The output ports 108a, 108b are separated by a distance, d. According to various embodiments, the distance, d, is approximately 1 to 10 mm. It is noted, however, the other suitable distances may be incorporated and/or implemented while maintaining to the spirit and functionality of the present disclosure.

Each wavelength of light being transmitted in a given waveguide arm 102, 106a, 106b exists as an optical mode. According to various embodiments, each optical mode exhibits a particular spatial extent and has a characteristic mode profile that is dependent on the waveguide parameter of the waveguide arm 102, 106a, 106b. The waveguide parameter is dependent on the relative refractive indices and dimensions of the core and cladding regions and the wavelength of light being transmitted. Typically, each of the fiber-optic waveguide arms 102, 106a, and 106b is single mode for wavelengths longer than a certain minimum wavelength corresponding to the highest frequency of light for which the spectroferometer 300 is designed to work. The splitter 104 splits the light received between the two output ports 108a, 108b.

The spectroferometer 300 also includes at least one dispersive optical element such as a transmission diffraction grating 204. Additional imaging bundles, beam-shaping, collimating, and filtering optics may be included, for example, but for simplicity they are not shown here. The diffraction grating 204 interrupts the light incident on it and splits the light via the grating lines 206 and emits multiple secondary wavefronts 208.

According to an example of use of the spectroferometer 300, electromagnetic radiation, E, such as light that is to be analyzed, is received at either or both inputs 102, 202. Light propagating via 102 is split by the splitter 104 between the output waveguide arms 106a, 106b. The split light emerges respectively from the two output ports 108a, 108b. The emerging light diffracts and interferes to form a characteristic interference pattern that illuminates, and can be detected by, at least one detector 110. The detector 110 may be, for example, an array of individual photosensitive detector elements (pixels) 112, such as a CCD detector array. Light that is received by input 202 is interrupted by the lines 206 of the diffraction grating 204, and multiple secondary output wavefronts of light 208 emerge, respectively, from the diffraction grating 204. The emerging light diffracts and interferes to form a characteristic diffraction interference pattern that illuminates, and can be detected by, at least one detector 110. The overlap of the interference fringes generated using at least one splitter 104, and the pattern generated using at least one dispersive element, such as the diffraction pattern generated by diffraction grating 204, produces a spectroferogram that may be detected by at least one detector 110.

Each of the output ports 108a, 108b has a numerical aperture which can be wavelength dependent and relates to the relative refractive indices of a waveguide core region and a waveguide cladding region, as well as the physical size of the waveguide core. Light emerging from the output ports 108a, 108b diffracts into the surrounding medium (typically air) with a divergence angle that depends on the numerical aperture of the respective output port 108a, 108b. Typically, each of the output ports 108a, 108b has the same numerical aperture for a given wavelength.

As the two diffracted beams emerge from the output ports 108a, 108b, and each propagate and diverge, the beams spatially overlap such that the fields of the wave fronts interfere. The fields, due to the overlapping beams, provide an intensity variation that depends on a relative optical path delay difference which is, in turn, dependent on the wavelength of the emerging light. This intensity variation in a given plane is an interference fringe pattern that is characteristic of the emerging light. The delay difference evolves across the detector surface 110 to form the interference fringes and is used to form an interferogram, which is a spatially or temporally dependent image or representation of the light intensity variation in the plane of the detector 110.

Each of the outputs 208 from the diffraction grating lines 206 has a numerical aperture, which, respectively, can be wavelength dependent and relate material index properties as well as the physical sizes. Light emerging from the lines 206 diffracts into the surrounding medium (typically air) with a divergence angle that depends on the numerical aperture of the respective lines. Typically, the grating lines will be uniform so each line of the lines 206 has the same numerical aperture for a given wavelength.

The one or more interferometer beam-splitting elements and/or the one or more spectrometer beam-dispersing elements can be static or dynamically adjustable. As the beams diffract outward from the diffraction grating 204, they, respectively, propagate and diverge, and the beams spatially overlap such that the fields of the wavefronts interfere. The fields, due to the overlapping beams, provide an intensity variation that depends on relative optical path delay differences which are, in turn dependent, on the wavelengths of the emerging light. This intensity variation in a given plane is an interference fringe pattern that is known as a diffraction pattern that is characteristic of the emerging light. The delay difference evolves across the detector surface 210 to form the interference fringes and is used to form a diffraction pattern, which is a spatially- or temporally-dependent image or representation of the light intensity variation in the plane of the detector 110.

Each of the elements 112 of the detector 110 is arranged, for example, to generate a charge signal proportional to the intensity of light incident on the element 112, such that the detector 110 can be used to measure the spectroferogram. Typically, the spectroferometer 300 is arranged such that at least two elements 112 of the detector 110 detect light from each interference fringe component of the spectroferogram in order that the spatial sampling rate is at least twice the spatial periodicity of the interference fringe pattern. This enables the spectroferometer 300 to satisfy the Nyquist sampling criterion and provide a lossless measurement of the fringe periodicity for the interferogram component of the spectroferogram.

For broad band operation, the diffraction pattern generated from the dispersive element of the spectroferometer 300 (e.g., the diffraction grating 204) is typically arranged such that, at each wavelength of light, it is confined to one or few of the elements 112 of the detector 110 to optimize the number of wavelengths that can be detected and resolved in the spectrum of incident light.

Typically, the spectroferogram is processed by either dedicated processing electronics (not shown), or a computer programmed with suitable processing software that receives a digital representation of the spectroferogram. The processing electronics or computer reads the charge signals from the detector to form a spatial intensity profile, thus capturing an image of the spectroferogram. The processing electronics or processing software may then process the captured spatial image data using, for example, one or more of fringe counting and weighting, transform processing, or any other suitable processing technique to analyze the spatially dependent intensity pattern. This enables characterization of the light illuminating the spectroferometer 300 and enables spectral and/or temporal and/or phase and/or amplitude and/or polarization information to be recovered that may be further analyzed and processed.

Through mathematically processing the spectroferogram, it is possible to selectively choose, separate, and recombine high and low frequency components contained in the spectroferogram. According to various embodiments, the spectroferometer 300 includes one or more processors 305 and one or more memory 310. The memory 310 is configured to store instructions which, when executed by the processor 305, cause the processor 305 to process one or more signals generated by the one or more radiation sensitive elements, generate a spatial intensity profile of the incident electromagnetic radiation, and/or recover data from the spatial intensity profile. According to various embodiments, the data recovery is performed using suitable techniques such as, for example, transform processing techniques, curve fitting techniques, frequency filtering techniques, fringe counting techniques, interpolation techniques, weighting techniques, one or more orders of differentiation, one or more orders of integration, predictive analysis techniques, machine learning techniques, artificial intelligence techniques, and/or other suitable techniques. The data includes temporal data, spectral data, phase data, amplitude data, polarization data, and/or other suitable types of data.

The spectroferometer 300 can be used in any suitable field for any suitable application. For example, the spectroferometer 300 may be used in the application of process monitoring, in the application of production monitoring, in manufacturing applications, in the application of in-line monitoring, in the application of closed loop, adaptive process control monitoring, and/or in other suitable applications. Furthermore, it is noted that the spectroferometer 300 has the advantage of simultaneously capturing and recording synchronized data sets of a multitude of data onto a single detector array. Furthermore, it is noted that the spectroferometer 300 has the advantage of a significantly reduced data set size by capturing a multitude of data onto a single detector array and how this reduces that burgeoning quantity of data associated with internet of things (IoT) applications including, but not limited to, the industrial internet of things (IIoT), process monitoring, closed-loop control, adaptive process control, and additive manufacturing applications.

The foregoing description of the embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the scope of the invention, and all such variations are intended to be included within the scope of the following claims.

What is claimed is:

1. An apparatus comprising:
   an enclosure;
   one or more interferometer beam-splitting elements; and
   one or more spectrometer beam-dispersing elements, wherein the one or more interferometer beam-splitting elements and the one or more spectrometer beam-dispersing elements:

are housed in the enclosure;

share one or more radiation sensitive elements, which are arranged to generate a signal in response to incident electromagnetic radiation; and each generate one or more optical outputs, wherein the one or more optical outputs are arranged such that respective optical axes intersect substantially in a plane of the one or more radiation sensitive elements, wherein the one or more optical outputs of the one or more interferometer beam-splitting elements comprise two or more optical outputs configured to form an interference pattern on the one or more radiation sensitive elements, and wherein the one or more optical outputs of the one or more spectrometer beam-dispersing elements comprise one or more outputs configured to form a diffraction fringe pattern on the one or more radiation sensitive elements.

2. The apparatus of claim 1, further comprising one or more reflective surfaces between the optical outputs.

3. The apparatus of claim 2, wherein the one or more reflective surfaces include one or more optical coatings on one or more of the reflective surfaces.

4. The apparatus of claim 3, wherein the one or more of the reflective surfaces are microelectromechanical systems (MEMS) elements, wherein each of the MEMS elements are controllable and are configured to reflect a portion of the incident electromagnetic radiation.

5. The apparatus of claim 1, wherein the one or more radiation sensitive elements are configured to detect one or more inputs originating from one or more spatially distinct locations.

6. The apparatus of claim 5, wherein the one or more inputs include the one or more optical outputs from the one or more interferometer beam-splitting elements and/or the one or more spectrometer beam-dispersing elements.

7. The apparatus of claim 5, wherein the one or more inputs originate from one or more imaging bundles.

8. The apparatus of claim 5, wherein the one or more inputs originate from one or more optical waveguides.

9. The apparatus of claim 8, wherein the one or more optical waveguides include one or more optical fibers.

10. The apparatus of claim 1, further comprising one or more optical waveguides.

11. The apparatus of claim 10, wherein the one or more optical waveguides include one or more optical fibers.

12. The apparatus of claim 11, wherein the one or more optical fibers include one or more of: microstructured optical fibers; and multicore optical fibers.

13. The apparatus of claim 1, wherein the one or more interferometer beam-splitting elements are dynamically adjustable.

14. The apparatus of claim 1, wherein the one or more spectrometer beam-dispersing elements are dynamically adjustable.

15. The apparatus of claim 1, further comprising:

one or more processors; and a memory, configured to store instructions which, when executed by the one or more processors, cause the one or more processors to:

process one or more signals generated by the one or more radiation sensitive elements; and generate a spatial intensity profile of the incident electromagnetic radiation.

16. The apparatus of claim 15, wherein the instructions, when executed by the one or more processors, further cause the one or more processors to:

recover data from the spatial intensity profile using one or more of:

transform processing techniques;

curve fitting techniques;

frequency filtering techniques;

fringe counting techniques;

interpolation techniques;

weighting techniques;

one or more orders of differentiation;

one or more orders of integration;

predictive analysis techniques;

machine learning techniques; and artificial intelligence techniques, wherein the data includes one or more of: temporal data; spectral data; phase data; amplitude data; and polarization data.

17. The apparatus of claim 1, wherein the one or more spectrometer beam-dispersing elements comprise elements of a transmission diffraction grating.

18. The apparatus of claim 1, wherein the one or more interferometer beam-splitting elements are configured to provide substantially equal light at each of two or more of the one or more optical outputs of the one or more interferometer beam-splitting elements.

19. A method of analyzing electromagnetic radiation, comprising:

providing an apparatus, including:

an enclosure;

a processor;

a memory;

one or more interferometer beam-splitting elements; and one or more spectrometer beam-dispersing elements, wherein the one or more interferometer beam-splitting elements and the one or more spectrometer beam-dispersing elements:

are housed in the enclosure;

share one or more radiation sensitive elements, which are arranged to generate a signal in response to incident electromagnetic radiation; and each generate one or more optical outputs, wherein the one or more optical outputs are arranged such that respective optical axes intersect substantially in a plane of the one or more radiation sensitive elements;

processing, using the processor, one or more signals generated by the one or more radiation sensitive elements, wherein the one or more optical outputs of the one or more interferometer beam-splitting elements comprise two or more optical outputs configured to form an interference pattern on the one or more radiation sensitive elements, and wherein the one or more optical outputs of the one or more spectrometer beam-dispersing elements comprise one or more outputs configured to form a diffraction fringe pattern on the one or more radiation sensitive elements; and generating a spatial intensity profile of the incident electromagnetic radiation.

20. The method of claim 19, further comprising:

recovering, using the processor, data from the spatial intensity profile using one or more of:

transform processing techniques;

curve fitting techniques;

frequency filtering techniques;

fringe counting techniques;

interpolation techniques;

weighting techniques;

one or more orders of differentiation;

one or more orders of integration;

predictive analysis techniques;

machine learning techniques; and artificial intelligence techniques, wherein the data includes one or more of: temporal data; spectral data; phase data; amplitude data; and polarization data.

* * * * *